United States Patent
Haka

(10) Patent No.: US 6,663,529 B1
(45) Date of Patent: Dec. 16, 2003

(54) PLANETARY MANUAL POWER TRANSMISSION

(75) Inventor: Raymond James Haka, Brighton, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/184,586

(22) Filed: Jun. 28, 2002

(51) Int. Cl.$^7$ .................................................. F16H 3/44
(52) U.S. Cl. ......................................................... 475/303
(58) Field of Search ........................................... 475/303

(56) References Cited

U.S. PATENT DOCUMENTS

| | | | | |
|---|---|---|---|---|
| 2,503,497 A | * | 4/1950 | Le May | 475/303 |
| 2,582,487 A | * | 1/1952 | Kelbel | 475/303 |
| 2,584,468 A | * | 2/1952 | Kelbel | 475/303 |
| 5,593,358 A | * | 1/1997 | Frost | 475/218 |

* cited by examiner

*Primary Examiner*—Dirk Wright
(74) *Attorney, Agent, or Firm*—Leslie C. Hodges

(57) ABSTRACT

A planetary manual transmission has two planetary gearsets and five synchronizer clutches which are effective to establish at least six forward speed ratios and one reverse speed ratio between a transmission input shaft and a transmission output shaft. One of the planetary gearsets is a compound planetary gearset and the other is a simple planetary gearset. These two planetary gearsets are interconnected through two of the synchronizer clutches. The third of the synchronizer clutches connects one of the planetary gearsets with the input shaft. The fourth of the synchronizer clutches connects the other of the planetary gearsets with an output shaft, and the fifth of the synchronizer clutches selectively connects two members of the planetary gearsets connected with the output shaft to a transmission housing or stationary component. In one embodiment, the planetary gearsets will provide six forward speed ratios and in another embodiment, the planetary gearsets will provide eight forward speed ratios.

8 Claims, 2 Drawing Sheets

PLANETARY MANUAL POWER TRANSMISSION

TECHNICAL FIELD

This invention relates to manual-type transmissions and, more particularly, to manual-type transmissions employing planetary gearsets.

BACKGROUND OF THE INVENTION

Automobiles generally employ one of two types of transmissions, either a manual-type transmission or an automatic shifting-type transmission. Manual-type transmissions include an input clutch, which is selectively engageable to connect a transmission input shaft with an engine output shaft. The transmission input shaft generally has a head gearset, which provides a step ratio between the input shaft and a countershaft, which has a plurality of gear members rotatably mounted thereon. An output shaft generally has another plurality of gears meshing with the gears in the countershaft to provide various ratios between the input shaft and the output shaft. Either the gear mechanisms on the countershaft or the gear mechanisms on the output shaft are interconnected with their respective shaft through mechanical clutches, commonly termed synchronizer clutches. The number of meshing pairs of gears is equal to the number of forward gears (assuming one of the forward gears is one to one) plus one idler gear for the reverse operation.

The synchronizer clutches are manipulated either through a manual linkage controlled by the operator or through a hydraulic or electrical actuator which is also manipulated by the operator.

SUMMARY OF THE INVENTION

It is an object of the present invention to provide an improved manual-type transmission employing two planetary gearsets.

In one aspect of the present invention, one of the planetary gearsets is interconnectible with the input shaft through a two-way synchronizer, which has an input portion selectively connectible with a power input shaft through a selectively engageable input clutch.

In another aspect of the present invention, a second selectively operable synchronizer clutch is connectible to provide two output members from the first planetary gearset individually.

In yet another aspect of the present invention, the second synchronizer clutch has an output member, which provides input drive to a third synchronizer clutch.

In still another aspect of the present invention, a third synchronizer clutch is selectively manipulable to three positions to establish three input drive paths to the second of the planetary gearsets.

In a yet still another aspect of the present invention, the second of the planetary gearsets has two members thereof selectively connectible with a transmission output shaft through a fourth selectively manipulable synchronizer clutch.

In a further aspect of the present invention, a fifth synchronizer clutch is operable to selectively connect two members of the second planetary gearset with a ground member, such as the transmission case.

In a yet further aspect of the present invention, the synchronizer clutches are manipulable in combinations to establish at least six forward speed ratios and one reverse speed ratio between the input shaft and the output shaft of the transmission.

The present invention incorporates two planetary gearsets, which are interconnected with each other through two selectively operable synchronizer clutches. One of the planetary gearsets is selectively connectible with a transmission input shaft through another synchronizer clutch. The second of the planetary gearsets is selectively connectible with a transmission output shaft through yet another synchronizer clutch. The second planetary gearset also incorporates a synchronizer clutch, which selectively connects two of the members of the second planetary gearset with a ground portion of the transmission.

The first of the planetary gearsets, in at least one embodiment of the present invention, is a simple planetary gearset and the second planetary gearset is a compound planetary gearset. In another embodiment of the present invention, the input planetary gearset is a compound planetary gearset and the output planetary gearset is a simple planetary gearset.

DESCRIPTION OF EXEMPLARY EMBODIMENTS

Figure 1:
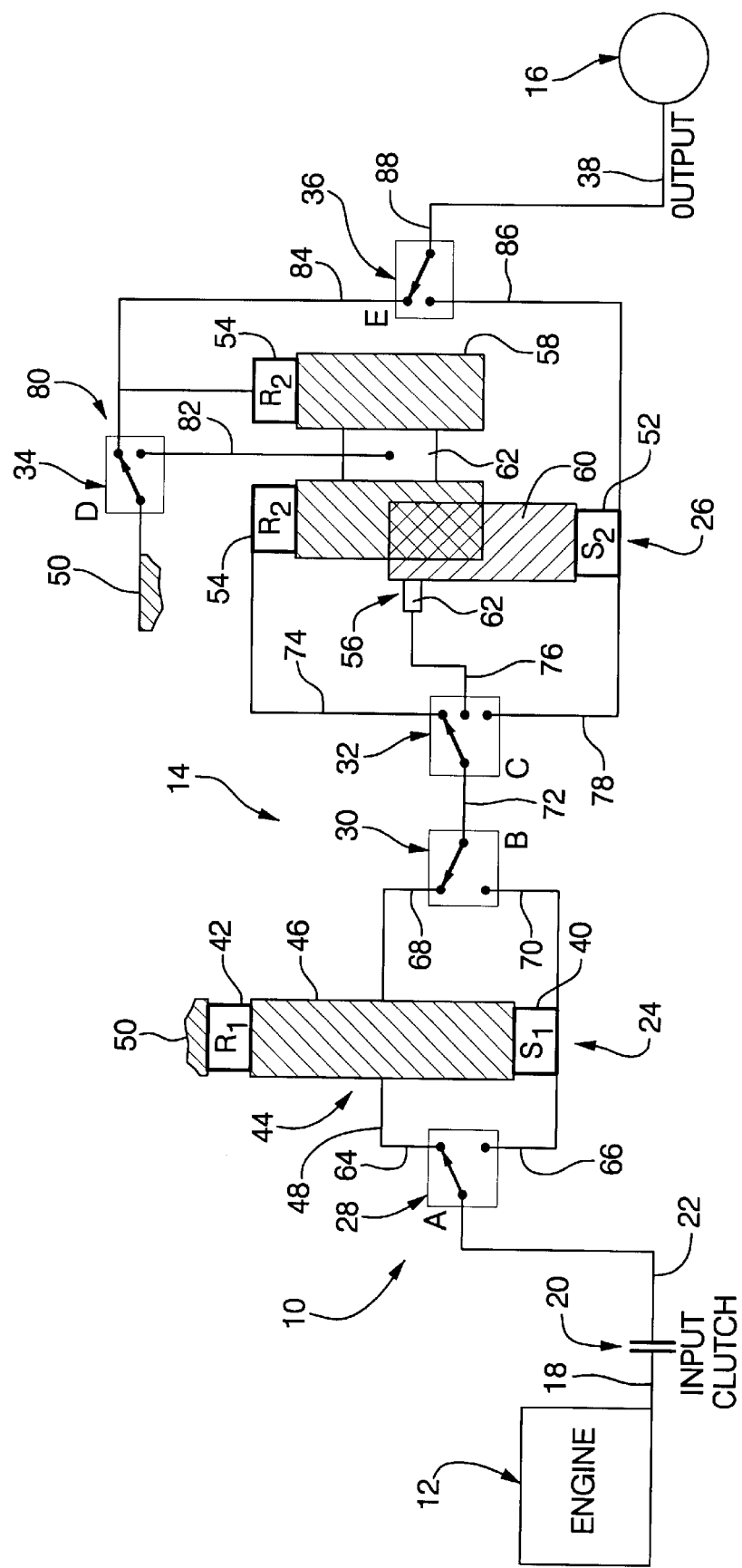
FIG. 1 is a schematic representation of a powertrain incorporating one embodiment of the present invention.

Referring to the drawings, there is seen in FIG. 1 a powertrain 10 having an engine 12, a planetary transmission 14, and a final drive mechanism 16. The engine 12 and final drive mechanism 16 are conventional units, which are well known in the art. The final drive mechanism 16, as is well known, is connectible to drive at least two wheels of the vehicle, not shown.

The engine 12 has an output shaft 18, which is operatively or drivingly connected with a selectively engageable input clutch 20. The input clutch 20 has an output portion operatively or drivingly connected with a transmission input shaft 22, which is a portion of the planetary transmission 14. The planetary transmission 14 further includes a first planetary gearset 24, a second planetary gearset 26, a first synchronizer clutch assembly 28, a second synchronizer clutch assembly 30, a third synchronizer clutch assembly 32, a fourth synchronizer clutch assembly 34, a fifth synchronizer clutch assembly 36, and an output shaft 38.

The planetary gearset 24 includes a sun gear member 40, a ring gear member 42, and a planet carrier assembly member 44. The planet carrier assembly member 44 includes a plurality of pinion gear members 46 rotatably mounted on a planet carrier member 48 and disposed in meshing relationship with both the sun gear member 40 and the ring gear member 42. The ring gear member 42 is continuously connected with a stationary member, such as a transmission housing 50. The planetary gearset 24 is commonly termed a simply planetary gearset.

The planetary gearset 26 includes a sun gear member 52, a split ring gear member 54, and a planet carrier assembly member 56. The planet carrier assembly member 56 includes a plurality of long pinion gear members 58 meshing with the ring gear member 54, and a short pinion gear member 60 meshing with both the long pinion 58 and the sun gear member 52. The pinion gear members 58 and 60 are rotatably mounted on a planet carrier member 62. The planetary gearset 26 is commonly termed a compound planetary gearset.

The synchronizer clutches 28, 30, 34, and 36 are conventional two-way synchronizer clutch assemblies, the manufacture and assembly of which is well known in the art. The synchronizer clutch assembly 32 is a three-way synchronizer clutch assembly which is also a conventional mechanical device, the operation and construction of which is well known in the art.

The synchronizer clutch assembly 28 has an input portion continuously connected with the input shaft 22 and two output portions 64 and 66, which are drivingly connected with the planet carrier member 48 and the sun gear member 40, respectively. The synchronizer clutch assembly 30 includes two input portions 68 and 70, and one output portion 72. The input portion 68 is continuously drivingly connected with the planet carrier member 48 and the input portion 70 is continuously drivingly connected with the sun gear member 40. The output portion 72 provides an input portion for the synchronizer clutch assembly 32.

The synchronizer clutch assembly 32 has three output portions 74, 76, and 78 which are continuously drivingly connected with the ring gear member 54, the planet carrier member 62, and the sun gear member 52, respectively. The synchronizer clutch assembly 34 has an input portion, which is continuously connected with the transmission housing 50 and two output portions 80 and 82. The output portion 80 is drivingly connected with both the ring gear member 54 and with an input portion 84 of the synchronizer clutch 36. The output portion 82 is continuously drivingly connected with the planet carrier member 62. The synchronizer clutch assembly 36 has another input portion 86 and an output portion 88. The input portion 86 is continuously drivingly connected with the sun gear member 52 and the output portion 88 is continuously drivingly connected with the transmission output shaft 38.

The synchronizer clutch assembly 28 can be manipulated to selectively connect the input shaft 22 with either the sun gear member 40 or the planet carrier member 48 thereby interconnecting these planetary gear members selectively with the engine output shaft 18. The synchronizer clutch assembly 30 is manipulable to connect either the planet carrier member 48 or the sun gear member 40 with the synchronizer clutch assembly 32. The synchronizer clutch assembly 32 is then operable to interconnect the planet carrier member 48 or the sun gear member 40 with the ring gear member 54, the planet carrier member 62, or the sun gear member 52. The synchronizer clutch assembly 34 is selectively manipulable to connect either the ring gear member 54 or the planet carrier member 62 with the transmission housing 50. The synchronizer clutch assembly 36 is selectively manipulable to interconnect the sun gear member 52 or the ring gear member 54 with the transmission output shaft 38.

The synchronizer clutches 28, 30, 32, 34, and 36 are selectively engageable in combinations to establish six forward speed ratios and one reverse speed ratio between the input shaft 22 and the output shaft 38.

To establish a reverse speed ratio, the synchronizer clutch 28 is manipulated to connect the sun gear member 40 with the input clutch 20; the synchronizer clutch 30 is manipulated to connect the planet carrier member 48 with the synchronizer clutch 32; the synchronizer clutch 32 is manipulated to connect the planet carrier member 62 with the planet carrier member 48; the synchronizer clutch 34 is manipulated to connect the ring gear member 54 to the ground or transmission housing 50; and the synchronizer clutch 36 is manipulated to connect the sun gear member 52 with the output shaft 38. The planetary gearset 24 provides an underdrive ratio from the input shaft 22 to the synchronizer clutch 32. The planetary gearset 26 provides a reverse ratio from the synchronizer clutch 32 through the output shaft 38. To complete a drive path from the engine 12 to the final drive mechanism 16, the input clutch 20 is manipulated by the operator in a conventional manner.

The first forward speed ratio is established by manipulating the synchronizer clutch 28 to connect the input shaft 22 with the sun gear member 40; the synchronizer clutch 30 is manipulated to connect the planet carrier member 48 with the synchronizer clutch 32; the synchronizer clutch 32 is manipulated to connect the sun gear member 52 with the planet carrier member 48; the synchronizer clutch 34 is manipulated to connect the planet carrier member 62 with the transmission housing 50; and the synchronizer clutch 36 is manipulated to connect the ring gear member 54 with the output shaft 38. With this combination of engagements, both of the planetary gearsets 24 and 26 establish underdrive ratios between the input shaft 22 and the output shaft 38. Again, to complete the drive ratio or power path from the engine 12 to the final drive mechanism 16, the clutch 20 is engaged by the operator. It is necessary to disengage the clutch 20 during a ratio change from reverse to first. Also, the clutch 20 is manipulated to a disengaged condition to permit any ratio interchange, which the operator may wish to undertake.

To establish the second forward speed ratio, the synchronizer clutches 28 and 30 are retained in their first gear position. The synchronizer clutch 32 is manipulated to connect the sun gear member 52 with the synchronizer clutch 30; the synchronizer clutch 34 is placed in an open condition; and the synchronizer clutch 36 is manipulated to connect the sun gear member 52 with the output shaft 38. In the second forward speed ratio, the planetary gearset 24 is in an underdrive condition and the planetary gearset 26 is in a direct drive condition.

To establish the third forward speed ratio, the synchronizer clutches 28 and 30 remain in the underdrive condition selection. The synchronizer clutch 32 is manipulated to connect the ring gear member 54 with the synchronizer clutch 30; the synchronizer clutch 34 is manipulated to connect the planet carrier member 62 with the transmission housing 50; and the synchronizer clutch 36 is manipulated or retained to provide a connection between the sun gear member 52 and the output shaft 38. During the third forward speed ratio, the planetary gearset 24 is in an underdrive condition and the planetary gearset 26 is in an overdrive condition.

During the fourth forward speed ratio, the planetary gearset 24 is placed in a direct drive condition by manipulating the synchronizer clutches 28 and 30 to both interconnect with the sun gear member 40, and the synchronizer clutches 32 and 36 are manipulated to connect with the sun gear member 52 while the synchronizer clutch 34 is left open. This provides a direct drive from the input shaft 22 to the output shaft 38.

The fifth forward speed ratio is established by manipulating the synchronizer clutch 28 to connect the input shaft 22 with the planet carrier member 48 and the synchronizer clutch 30 is manipulated to connect with the sun gear member 40. The synchronizer clutch 32 is manipulated to connect the sun gear member 40 with the sun gear member 52; the synchronizer clutch 34 is manipulated to connect the planet carrier member 62 with the transmission housing 50; and the synchronizer clutch 36 is manipulated to connect the ring gear member 54 with the output shaft 38. During the fifth forward speed ratio, the planetary gearset 24 is in an overdrive condition and the planetary gearset 26 is in an underdrive condition.

To establish the sixth forward speed ratio, the planetary gearset 24 is again placed in a 1:1 condition and the planetary gearset 26 is placed in an overdrive condition by connecting the synchronizer clutch 32 with the ring gear member 54; connecting the synchronizer clutch 34 with the planet carrier member 62; and connecting the synchronizer clutch 36 with the sun gear member 52.

By way of example, if the ring gear 50/sun gear 40 tooth ratio is selected as 1.50 and the ring gear 54/sun gear 52 tooth ratio is selected as 1.70, the speed ratios will be as follows:

| | |
|---|---|
| Reverse | −3.571 |
| First gear | 4.250 |
| Second gear | 2.50 |
| Third gear | 1.471 |
| Fourth gear | 1.00 |
| Fifth gear | .680 |
| Sixth gear | .588 |

The first three forward speed ratios are underdrive ratios, the fourth forward speed ratio is a direct drive ratio, and the fifth and sixth forward speed ratios are overdrive ratios.

Figure 2:
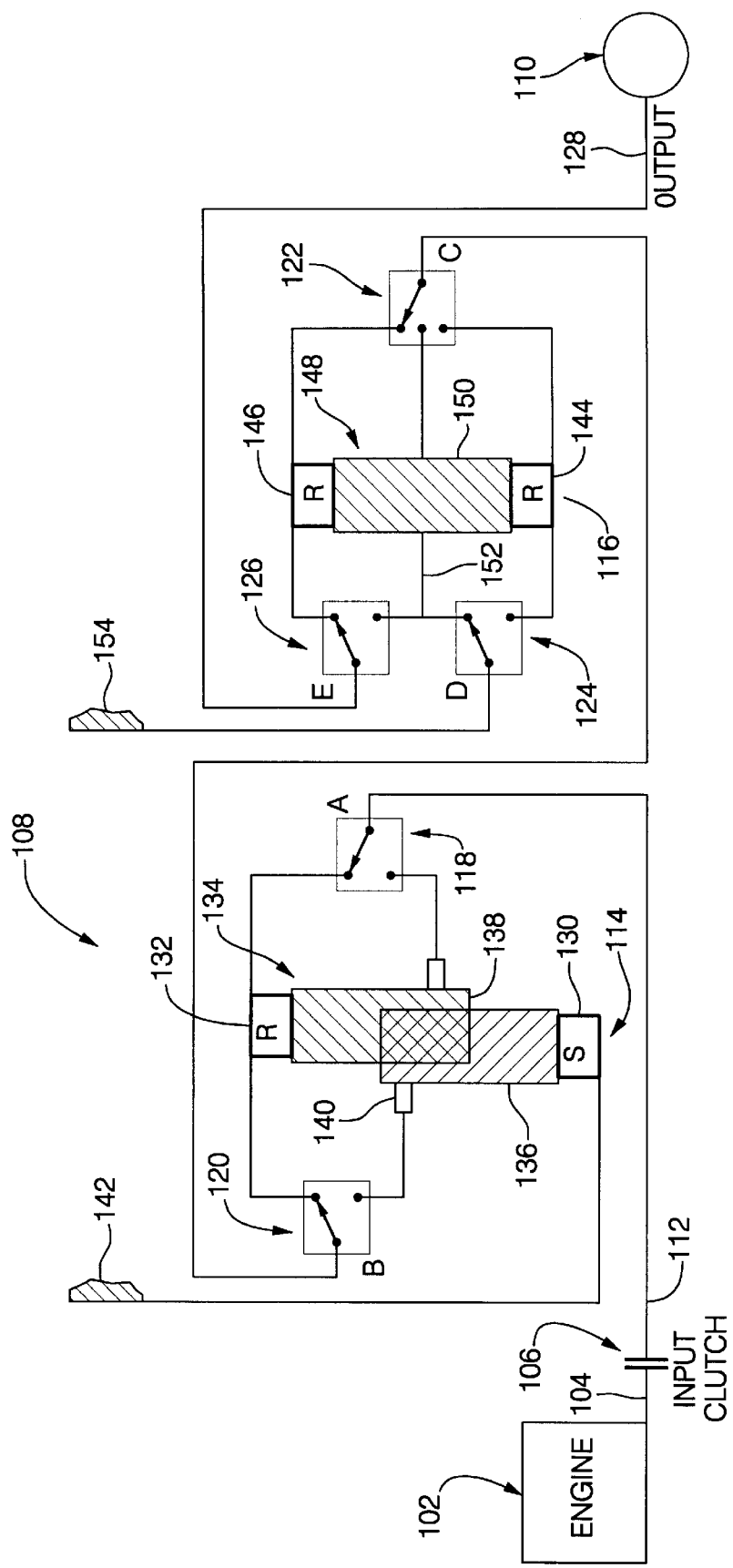
FIG. 2 is a schematic representation of a powertrain incorporating another embodiment of the present invention.

A powertrain 100 is shown in FIG. 2. The powertrain 100 includes an engine or prime mover 102, an engine shaft 104, an input clutch 106, a planetary transmission 108, and a final drive mechanism 110. The planetary transmission 108 includes an input shaft 112, a planetary gearset 114, a planetary gearset 116, a synchronizer clutch 118, a synchronizer clutch 120, a synchronizer clutch 122, a synchronizer clutch 124, and a synchronizer clutch 126, and an output shaft 128.

The synchronizer clutches 118, 120, 124, and 126 are two-position synchronizer clutches, which have a neutral position in the center and the construction of which is well known in the art. The synchronizer clutch 122 is a three-position synchronizer clutch with neutral conditions between each of the operable conditions. As with FIG. 1, the three-way synchronizer clutch is a well-known structure.

The planetary gearset 114 includes a sun gear member 130, a ring gear member 132, and a planet carrier assembly member 134. The planet carrier assembly member 134 includes a pair of intermeshing pinion gears 136 and 138, which are rotatably mounted on a planet carrier member 140 and disposed in meshing relationship with the sun gear member 130 and the ring gear member 132, respectively. The sun gear member 130 is continuously connected with a transmission housing 142. The ring gear member 132 and planet carrier member 140 are drivingly connected with the synchronizer clutches 118 and 120. The synchronizer clutch 118 is continuously drivingly connected with input shaft 112. The synchronizer clutch 120 is continuously drivingly connected with the synchronizer clutch 122. The planetary gearset 114 is a compound planetary gearset.

The planetary gearset 116 includes a sun gear member 144, a ring gear member 146, and a planet carrier assembly member 148. The planet carrier assembly member 148 includes a plurality of pinion gears 150 rotatably mounted on a planet carrier member 152 and disposed in meshing relationship with both the sun gear member 144 and the ring gear member 146. The planetary gearset 116 is a simple planetary gearset.

The sun gear member 144 is drivingly connected with both the synchronizer clutches 122 and 124. The ring gear member 146 is drivingly connected with both synchronizer clutches 122 and 126. The planet carrier member 152 is drivingly connected with the synchronizer clutches 122, 124, and 126. The synchronizer clutch 124 is continuously connected with a transmission housing 154, such that the sun gear member 144 and planet carrier member 152 can be selectively individually connected with the transmission housing 154 and therefore held stationary. The synchronizer clutch 126 is continuously drivingly connected with the output shaft 128 and is manipulable to interconnect the ring gear member 146 or the planet carrier member 152 with the output shaft 128. The synchronizer clutch 122 is, as previously mentioned, continuously connected with the synchronizer clutch 120 and manipulable to interconnect the ring gear member 146, the planet carrier member 152, and the sun gear member 144, individually with the synchronizer clutch 120. The synchronizer clutch 120 is considered an output member of the planetary gearset 114, such that the output of the planetary gearset 114 can be individually connected with any of the three members 144, 146, and 152 of the planetary gearset 116.

The synchronizer clutch 118 is considered an input member of the planetary gearset 114, such that the input shaft 112 can be selectively interconnected with either the ring gear member 132 or the planet carrier member 140 thereby providing input drive to these two planetary members. The synchronizer clutch 124 is considered a grounding element for the planetary gearset 114 and may selectively ground either the planet carrier member 152 or the sun gear member 144 to the transmission housing 142. The synchronizer clutch 126 is considered an output member of the planetary gearset 116 and as such can selectively interconnect the ring gear member 146 and the planet carrier member 152 with the output shaft 128.

The synchronizer clutches 118, 120, 122, 124, and 126 are selectively engageable in combinations to establish a reverse speed ratio and eight forward speed ratios between the input shaft 112 and the output shaft 128.

The reverse speed ratio is established with the synchronizer clutch 118 engaged with the planet carrier member 140; the synchronizer clutch 120 connected with the ring gear member 132; the synchronizer clutch 122 connected with the sun gear member 144; the synchronizer clutch 124 connected with the planet carrier member 152; and the synchronizer clutch 126 connected with the ring gear member 146. When the input clutch 106 is engaged by the operator, the engine 102 will provide power to rotate the output shaft 128 in a direction opposite to the input shaft 112. During the reverse speed ratio, the planetary gearset 114 is in an underdrive ratio and the planetary gearset 116 is in a reverse drive ratio.

To establish the first forward speed ratio, the synchronizer clutch 118 is manipulated to connect with the planet carrier member 140; the synchronizer clutch 120 is manipulated to connect with the ring gear member 132; the synchronizer clutch 122 is manipulated to connect with the ring gear member 146; the synchronizer clutch 124 is manipulated to connect with the sun gear member 144; and the synchronizer clutch 126 is manipulated to connect with the planet carrier member 152. During the first forward speed ratio, both of the planetary gearsets 114 and 116 are in an underdrive condition.

To establish the second forward speed ratio, the synchronizer clutches 118 and 120 remain in the condition established with the first forward speed ratio; the synchronizer clutch 122 remains engaged with the ring gear member 146; the synchronizer clutch 124 is placed in a neutral condition; the synchronizer clutch 126 is manipulated to connect with the ring gear member 146. The input clutch 106 is, of course, disengaged during the ratio interchange occasioned by the manipulation of the synchronizer clutches. When the input clutch 106 is re-engaged, a power path from the engine to the output shaft 128 will be established. During the second forward speed ratio, the planetary gearset 114 is an underdrive condition and the planetary gearset 116 is in a direct drive or 1:1 condition.

The third forward speed ratio is established by manipulating the synchronizer clutches 118 and 120 to both connect with the ring gear member 132; the synchronizer clutch 122 is manipulated to connect with the ring gear member 146; the synchronizer clutch 124 is manipulated to connect with the sun gear member 144; and the synchronizer clutch 126 is manipulated to connect with the planet carrier member 152. During the third forward speed ratio, the planetary gearset 114 is in a 1:1 condition and the planetary gearset 116 is in an underdrive condition.

To establish the fourth forward speed ratio, the synchronizer clutch 118 is manipulated to connect with the planet carrier member 140; the synchronizer clutch 120 is manipulated to connect with the ring gear member 132; the synchronizer clutch 122 is manipulated to connect with the planet carrier member 152; the synchronizer clutch 124 is manipulated to connect with the sun gear member 144; and the synchronizer clutch 126 is manipulated to connect with the ring gear member 146. During the fourth forward speed ratio, the planetary gearset 114 is in an underdrive condition and the planetary gearset 116 is an overdrive condition.

To establish the fifth forward speed ratio, the synchronizer clutches 118 and 120 are both manipulated to connect with the ring gear member 132; the synchronizer clutches 122 and 126 are both manipulated to connect with the ring gear member 146; and the synchronizer clutch 124 is placed in a neutral condition. During the fifth forward speed ratio, both planetary gearsets 114 and 116 provide a 1:1 drive ratio. Therefore, the fifth forward speed ratio is a direct drive or a 1:1 ratio.

The sixth forward speed ratio is established by manipulating the synchronizer clutch 118 to engage the ring gear member 132; manipulating the synchronizer clutch 120 to engage the planet carrier member 140; manipulating the synchronizer clutch 122 to engage the ring gear member 146; manipulating the synchronizer clutch 124 to engage the sun gear member 144; and manipulating the synchronizer clutch 126 to engage the planet carrier member 152. During the sixth forward speed ratio, the planetary gearset 114 is in an overdrive condition and the planetary gearset 116 is in an underdrive condition.

To establish the seventh forward speed ratio, the synchronizer clutches 118 and 120 are manipulated to both engage the ring gear member 132; the synchronizer clutch 122 is manipulated to engage the planet carrier member 152; the synchronizer clutch 124 is manipulated to engage the sun gear member 144; and the synchronizer clutch 126 is manipulated to engage the ring gear member 146. During the seventh forward speed ratio, the planetary gearset 114 is in a 1:1 drive condition and the planetary gearset 116 is in an overdrive condition.

To establish the eighth forward speed ratio, the synchronizer clutch 118 is manipulated to engage the ring gear member 132; the synchronizer clutch 120 is manipulated to engage the planet carrier member 140; the synchronizer clutch 122 and synchronizer clutch 126 are both manipulated to engage the ring gear member 146; and the synchronizer clutch 124 is in a neutral condition. During the eighth forward speed ratio, the planetary gearset 114 is in an overdrive condition and the planetary gearset 116 is in a 1:1 drive condition.

By way of example, if the ring gear 132/sun gear 130 tooth ratio is selected as 2.00 and the ring gear 146/sun gear 144 tooth ratio is selected as 1.70, the speed ratios will be as follows:

| | |
|---|---|
| Reverse | −3.40 |
| First gear | 3.176 |
| Second gear | 2.00 |
| Third gear | 1.588 |
| Fourth gear | 1.259 |
| Fifth gear | 1.00 |
| Sixth gear | .794 |
| Seventh gear | .630 |
| Eighth gear | .500 |

In reviewing the above-described speed ratios, it can be determined that the first through fourth forward speed ratios are underdrive speed ratios, the fifth forward speed ratio is a 1:1 drive speed ratio, and the sixth through eighth forward speed ratios are overdrive ratios.

What is claimed is:

1. A planetary transmission comprising:

an input clutch;

an input shaft drivingly connected with said input clutch;

an output shaft;

a first planetary gearset having at least three members including a first member, a second member, and a third member;

a second planetary gearset having at least three members including a first member, a second member, and a third member;

a first synchronizer clutch selectively connecting said input shaft individually with said first member and said second member of said first planetary gearset;

a second synchronizer clutch selectively connecting said first member and said second member of said first planetary gearset with an output portion of said first planetary gearset;

a third synchronizer clutch drivingly connected with said second synchronizer clutch and being effective to interconnect each of said members of said second planetary gearset with said second synchronizer clutch;

a fourth synchronizer clutch selectively manipulable to engage said first and said second members of said second planetary gearset with a stationary component of said transmission;

a fifth synchronizer clutch selectively manipulable to connect said second member of said second planetary gearset and said third member of said second planetary gearset with said output shaft; and said synchronizer clutches being selectively engageable in a plurality of combinations to establish at least six forward speed ratios and one reverse speed ratio through said planetary gearsets between said input shaft and said output shaft.

2. The planetary transmission defined in claim 1 further comprising:
said third member of said first planetary gearset being continuously interconnected with said stationary component of said transmission.

3. The planetary transmission defined in claim 2 further comprising:
said first member of said first planetary gearset being a planet carrier member, said second member of said first planetary gearset being either a sun gear member or a ring gear member, and said third member of said first planetary gearset being either the sun gear member or ring gear member that is not the second member; and
said first member of said second planetary gearset being a ring gear member, said second member of said second planetary gearset being a member of a first group consisting of a planet carrier member and a sun gear member, and said third member of said second planetary gearset being a member of said first group that is not the third member.

4. The planetary transmission defined in claim 2 further wherein said first planetary gearset is a compound planetary gearset, and said second planetary gearset is a simple planetary gearset.

5. The planetary transmission defined in claim 2 further wherein said first planetary gearset is a simple planetary gearset, and said second planetary gearset is a compound planetary gearset.

6. The planetary transmission defined in claim 2 further comprising:
said first and second synchronizer clutches being manipulable to provide an underdrive ratio, an overdrive ratio, and a direct drive ratio through said first planetary gear set; and
said third, fourth, and fifth synchronizer clutches being manipulable to provide an underdrive ratio, a direct drive ratio, an overdrive ratio, and a reverse ratio through said second planetary gearset.

7. A planetary transmission comprising:
a selectively engageable input clutch;
an input shaft drivingly connected with said input clutch;
an output shaft;
a first planetary gearset having a sun gear member, a ring gear member, and a planet carrier member;
a second planetary gearset having a sun gear member a ring gear member, and a planet carrier member;
a first synchronizer clutch means for selectively connecting said input shaft individually with said sun gear member and said planet carrier member of said first planetary gearset;
a second synchronizer clutch means for selectively connecting said sun gear member and said planet carrier ember of said first planetary gearset individually with a third synchronizer clutch means;
a third synchronizer clutch means for connecting said second synchronizer clutch individually with said sun gear member, said ring gear member, and said planet carrier member of said second planetary gearset;
a fourth synchronizer clutch means for selectively individually connecting said planet carrier member and said ring gear member of said second planetary gearset with a stationary component of said transmission;
a fifth synchronizer clutch means for selectively individually connecting said ring gear member and said sun gear member of said second planetary gearset with said output shaft; and
said synchronizer clutches being selectively engageable in a plurality of combinations to establish at least six forward speed ratios and one reverse speed ratio through said planetary gearsets between said input shaft and said output shaft.

8. A planetary transmission comprising:
a selectively engageable input clutch;
an input shaft drivingly connected with said input clutch;
an output shaft;
a first planetary gearset having a sun gear member, a ring gear member, and a planet carrier member;
a second planetary gearset having a sun gear member a ring gear member, and a planet carrier member;
a first synchronizer clutch means for selectively connecting said input shaft individually with said ring gear member and said planet carrier member of said first planetary gearset;
a second synchronizer clutch means for selectively connecting said ring gear member and said planet carrier member of said first planetary gearset individually with a third synchronizer clutch means;
a third synchronizer clutch means for connecting said second synchronizer clutch individually with said sun gear member, said ring gear member, and said planet carrier member of said second planetary gearset;
a fourth synchronizer clutch means for selectively individually connecting said planet carrier member and said sun gear member of said second planetary gearset with a stationary component of said transmission;
a fifth synchronizer clutch means for selectively individually connecting said ring gear member and said planet member of said second planetary gearset with said output shaft; and
said synchronizer clutches being selectively engageable in a plurality of combinations to establish at least eight forward speed ratios and one reverse speed ratio through said planetary gearsets between said input shaft and said output shaft.

* * * * *